United States Patent [19]
Hirono et al.

[11] Patent Number: 5,444,799
[45] Date of Patent: Aug. 22, 1995

[54] IMAGE PROCESSING APPARATUS AND METHOD OF STRAIN CORRECTION IN SUCH AN IMAGE PROCESSING APPARATUS

[75] Inventors: Hideo Hirono; Hironobu Takahashi, both of Tsukuba, Japan

[73] Assignee: Sanyo Electric Co., Ltd., Osaka, Japan

[21] Appl. No.: 36,818

[22] Filed: Mar. 25, 1993

[30] Foreign Application Priority Data

Mar. 26, 1992 [JP] Japan .................................. 4-068295

[51] Int. Cl.⁶ .................................................. G06K 9/40
[52] U.S. Cl. .................................... 382/287; 382/309; 348/190
[58] Field of Search ........................ 382/58, 54, 57, 41; 348/187, 190; 358/486

[56] References Cited

U.S. PATENT DOCUMENTS

| | | | |
|---|---|---|---|
| 4,587,617 | 5/1986 | Barker et al. | 382/34 |
| 5,142,589 | 8/1992 | Lougheed et al. | 382/54 |
| 5,153,916 | 10/1992 | Znagaki et al. | 382/54 |
| 5,214,470 | 5/1993 | Denber | 382/54 |

OTHER PUBLICATIONS

Onodera, Yasuhiro, et al. "Geometric Correction of Images Without Camera Registration", Report of Res. in information Processing Inst., vol. 92, No. 7 Jan. 23, 24, 1992, pp. 115–118.

*Primary Examiner*—Yon J. Couso
*Attorney, Agent, or Firm*—Spensley Horn Jubas & Lubitz

[57] ABSTRACT

A checkered characteristic pattern is picked up by an image input device to form pick-up data. Characterizing points (intersecting points) are detected from the pick-up data. From the arrangement of the characterizing points about the center of the pattern and the positions of the characterizing points on the picture plane, a mapping function obtained when a TV camera is assumed to be a pin-hole camera is prepared. Reference positions of the characterizing points through the entire picture plane are calculated from the mapping function. The reference positions are compared with the actual positions on the picture plane to calculate a correcting function which in turn is stored in a correcting function preparing device. Normally, the inputted image is corrected by the correcting function and then outputted to an image output device.

11 Claims, 11 Drawing Sheets

IMAGE PROCESSING APPARATUS AND METHOD OF STRAIN CORRECTION IN SUCH AN IMAGE PROCESSING APPARATUS

BACKGROUND OF THE INVENTION

1. Field of the Invention

The present invention relates to image processing to provide a non-strained image from the data of an image pick-up device.

2. Description of the Related Art

The image pick-up device used in the prior art is typically a CCD camera which can pick up an object, process the data of the picked-up image (which will be referred to "pick-up data") and detect the position of the object. Three-dimensional vision is particularly important in an intelligent robot which self-supportingly behaves while judging its surrounding situations. In such an intelligent robot, it is desired to recognize the exact three-dimensional position of the object from the pick-up data obtained by the image pick-up device.

The utilization of the CCD camera greatly reduces the strain in a picked-up image, in comparison with the other image pick-up devices of the prior art. When the resulting pick-up data is processed, the position of the object can very exactly be recognized. In other words, the position of the object can be recognized by modeling the digitized image from the CCD camera with perspective conversion.

However, the digitized image obtained by the CCD camera has an actual strain due to various factors. Thus, the model obtained by the perspective conversion is not exact. In order to overcome such a problem, it has been proposed to perform various corrections on the pick-up data to improve the precision of detection when the three-dimensional position of the object is to be sensed from the pick-up data.

For example, Onodera et. al., "Report of Research in Information Processing Institute", Vol. 92, No. 7, pp 115–118, January 1992 discloses a process of picking up a grid pattern on a flat plate positioned perpendicular to the optical axis of a camera and correcting the pick-up data. Such a process is intended to correct a strain due to aberration of the camera lens. An appropriate correcting function will be defined considering such a strain. The correcting function determines a coefficient on the comparison of the pick-up data for each pixel with the grid pattern which has been known with respect to its positional relationship in the three-dimensional space and also on the fact that the boundaries in the grid pattern are rectilinear. The correcting function is utilized to correct the pick-up data.

When the strain in an image picked up is corrected based on the relationship between the position of the image in the three-dimensional space and the position of the image in the picture, the position of the object can be recognized with relative exactness. However, the prior art requires the placing of an object to be picked up, such as a grid pattern, at a known location relative to the image pick-up device. In practice, it is difficult to position the grid pattern at the exact location, due to variations of the optical axis of the image pick-up device and so on. Thus, the prior art could not completely and exactly correct the pick-up data.

SUMMARY OF THE INVENTION

It is therefore an object of the present invention to provide a novel and improved method and apparatus of exactly correcting the strain in picked up image.

To this end, the present invention provides a method of correcting the strain of an image in pick-up data obtained by an image pick-up device which may be a pin-hole camera, said method comprising the steps of:

(A) picking up a calibration pattern in which a plurality of characterizing points are known;

(B) extracting the characterizing points from the resulting pick-up data;

(C) calculating a mapping function representing the relationship between the positions of the characterizing points in the pick-up data obtained at said characterizing point extracting step and the positions of the characterizing points that have been known in said calibration pattern;

(D) calculating reference positions at which the characterizing points should be present in the pick-up data from the positions of the characterizing points in the calibration pattern by the use of said mapping function; and (E) calculating a correcting function for correcting the positions of the characterizing points, based on said reference positions and the positions of the characterizing points in the pick-up data.

When it is assumed that the image pick-up device is a pin-hole camera, the mapping function can be obtained by comparing the positions of characterizing points on a picture plane extracted from the pick-up data of a flat plate on which the calibration pattern including the predetermined arrangement of characterizing points is formed, with the positions of the actual picture plane. The mapping function can be applied to the flat plate which is placed at any location, without the need of any other means for determining the positional relationship between the camera and the flat plate.

The mapping function is then used to calculate the reference positions of all the characterizing points in the picture plane. The resulting reference positions are compared with the positions on the actual picture plane to calculate the correcting function. Therefore, an appropriate correcting function can be calculated by the present invention, in comparison with correction of the image strain based only on the positions of the picture plane. Such a correcting function can be utilized to provide a preferred correction of the image data.

It is preferred that the mapping function is calculated based on the positions of a given number of characterizing points substantially about the central data of the pick-up data obtained at the characterizing point extracting step and also on the characterizing points of the calibration pattern.

In other words, the mapping function can be calculated from the data of all or part of the picture plane. However, if a mapping function capable of causing a non-corrected image to coincide well with a corrected image is used, a desirable result can be obtained since the correction to the positions is reduced with a reduction of the protrusion of the image from the picture plane and marginal loss of the image due to shrinkage. Thus, the method of the present invention uses the substantially central data of the picture plane to obtain the mapping function, in view of the fact that the substantially central data of the picture plane has less strain and is very coincident with those of an image picked up by the pin-hole camera.

It is further preferred that the reference positions are calculated with respect to substantially all the characterizing points in the pick-up data by the use of the resulting mapping function.

It is further preferred that the calibration pattern is a checkered pattern having intersecting points which can be used as characterizing points in the present invention. Such a checkered pattern facilitates the calculation of characterizing points. Furthermore, even if the checkered pattern is slantingly disposed relative to the image pick-up device, a preferred correcting function can be calculated by the present invention.

The characterizing point calculating step may utilize a template defining computing means relating to the pick-up data of the surroundings matters which include positions to be processed. The template can be used to calculate an estimating value for each position to be processed. Characterizing points may more effectively be calculated on variations of these estimating values.

The characterizing point calculating step may also calculate the boundary lines of the pattern from variations of the pick-up data about the temporary characterizing points that have been calculated from the estimating values. Intersecting points between these boundary lines may be used to calculate the positions of the characterizing points. Thus, the characterizing points can more accurately be detected simply by using the template to calculate the characterizing points.

The boundary lines may be calculated by differentiating the pick-up data in both the vertical and horizontal directions.

In such a manner, the correcting function thus obtained may be utilized to correct the pick-up data, resulting in a non-strained image. When such a non-strained image is processed, the detection of position can more exactly be carried out to improve the precision in environmental measurement as in robots or the like.

As will be apparent from the above description, the present invention extracts charcterizing points from a calibration pattern formed on a flat plate and forms a mapping function from the positions of the characterizing points on the substantially central portion of the picture plane. The mapping function is then used to calculate the ideal or reference positions of the charcterizing points through the entire picture plane. The reference positions are then compared with the positions of the characterizing points on the entire picture plane to calculate a correcting function. Consequently, measurements may be carried out without the need of the specified positions on the pattern by placing the flat plate at an exact position or by exactly measuring the position of the flat plate. Furthermore, the correcting function thus obtained is very accurate and may correct the image data.

BRIEF DESCRIPTION OF THE DRAWINGS

FIG. 6(a)–(c) illustrate of a view illustrating the line fitting operation.

DETAILED DESCRIPTION OF THE PREFERRED EMBODIMENTS

Figure 1:
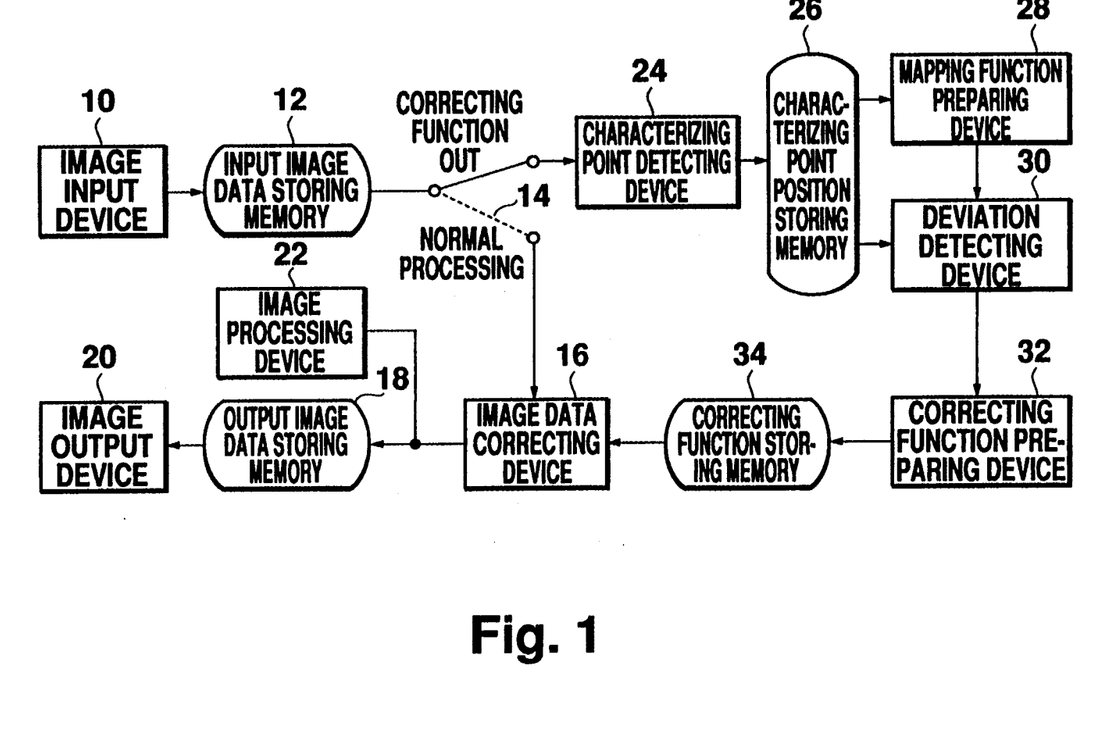
FIG. 1 is a block diagram of the entire arrangement of one embodiment according to the present invention.

Referring first to FIG. 1, there is shown a position detecting system relating to the present invention, which comprises an image input device 10 such as a CCD camera. The image input device 10 includes an A/D converter adapted to convert analog picture signals obtained as a luminance signal for each pixel into a digital signal which in turn is outputted from the image input device 10. The image data is fed from the image input device 10 to an input image data storing memory 12. Normally, the image data for one frame (one picture) is stored in the memory 12.

The image data is read out of the memory 12 and supplied to an image data correcting device 16 through a switch 14. The image data correcting device 16 has stored a correcting function and is adapted to correct the image data of each pixel from the input image data storing memory 12 by the use of the correcting function. The corrected image data is then supplied to an output image data storing memory 18 which is adapted to store the image data for one frame. The image data is sequentially read out from the memory 18 and then fed to an image output device 20. The image output device 20 may comprise a CRT and is adapted to perform a display depending on the image data which is stored in the memory 18. Normally, the data stored in the output image data storing memory 18 is read out in synchronism with vertical and horizontal synchronous signals and converted into a given video signal through a D/A converter before it is outputted to the CRT. Thus, the image output device 20 can display an image corrected with respect to its strain.

The image data correcting device 16 is also connected to an image processing section 22 which is adapted to perform various image processings (e.g. pattern recognition) on the image data corrected by the image data correcting device 16 and also to make the other operations such as recognition of the shape of an object in the image data, measurement of the distance between the camera and the object and so on. The measurement of distance may be carried out by using two such image input devices 10 such that the input image data from these image input devices 10 will be processed using trigonometry.

On the other hand, the switch 14 is connected to a characterizing point detecting device 24. When the switch 14 is shifted to the side of the characterizing point detecting device 24, the image data can be supplied from the input image data storing memory 12 to the characterizing point detecting device 24. More particularly, the switch 14 can be switched to supply the input image data to the image data correcting device 16 when the image is normally to be processed or outputted and to supply the input image data to the characterizing point detecting device 24 when the correcting function of the image data correcting device 16 is to be calculated, for example, at an initial setting The characterizing point detecting device 24 processes the input image data supplied thereto to detect the positions of characterizing points such as intersecting points in a checkered pattern. The results are supplied to a memory 26 for storing the positions of the characterizing points detected by the device 24. Normally, an input image data for one frame is processed. Data relating to the positions of the characterizing points is extracted from the processed input image data and stored in the memory 26.

The data relating to the positions of the characterizing points is then fed from the memory 26 to a mapping function preparing device 28. The mapping function preparing device 28 supposes that the image input device 10 is a pin-hole camera and calculates a mapping function for the image input device 10 from the inputted data. The mapping function is then supplied to a deviation detecting device 30. The deviation detecting device 30 also receives the data relating to the positions of the characterizing points from the memory 26. At the deviation detecting device 30, the reference positions of the characterizing points obtained by the use of the mapping function are compared with the detected positions of the characterizing points to determine a deviation therebetween. The deviation detecting device 30 is connected to a correcting function preparing device 32. The correcting function preparing device 32 receives a detected deviation from the deviation detecting device 30 to calculate a correcting function used to correct the data obtained by the mapping function. This correcting function is supplied to a correcting function storing memory 34.

The image data correcting device 16 reads out the correcting function stored in the correcting function storing memory 34 and corrects the input image data by the use of the read correcting function. Thus, the output image data storing memory 18 as well as the image processing section 22 can receive the corrected image data.

Figure 2:
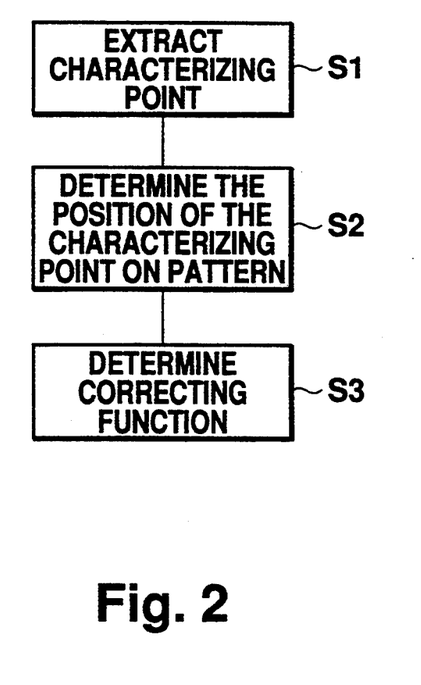
FIG. 2 is a flowchart illustrating the entire operation of the embodiment shown in FIG. 1.

The whole operation of calculating the correcting function will now be described with reference to FIG. 2. First of all, the characterizing point detecting device 24 processes inputted image data to extract characterizing points (S1). The system determines the positions of the extracted characterizing points in a pattern (S2). Using data of the characterizing points determined with respect to their positions in the pattern and data of the calibration pattern used, the system determines a correcting function by preparing a mapping function, detecting a deviation in the data processed and obtained by the use of the mapping function and preparing the correcting function for overcoming the deviation based on the detected values (S3).

Extraction of Characterizing Point

Figure 3:
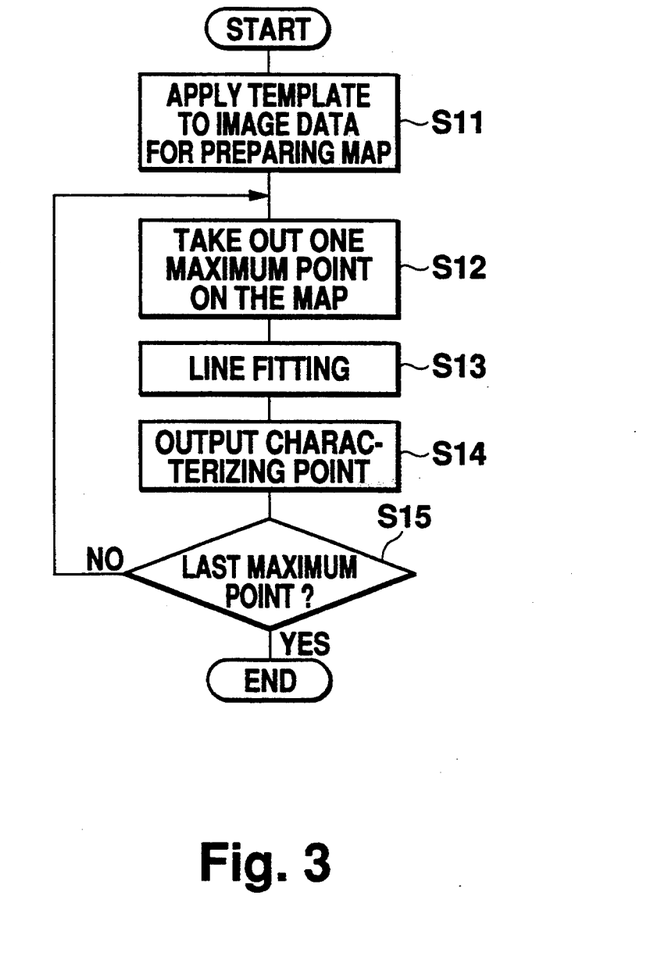
FIG. 3 is a flowchart illustrating the characterizing point extraction.

As will be apparent from FIG. 3, the correcting function may be first calculated by providing a specific calibration pattern and processing image data relating to such a calibration pattern. Thus, the extraction of characterizing points is carried out relative to the calibration pattern.

Figure 4:
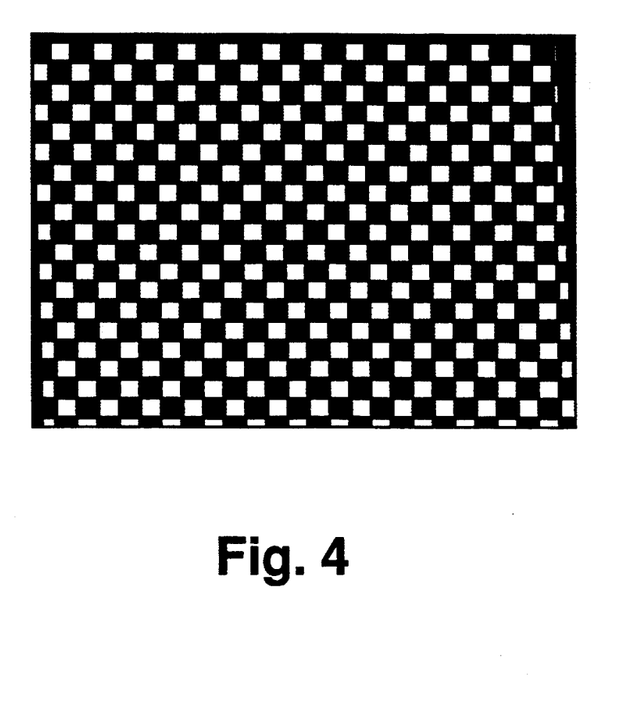
FIG. 4 is a calibration checkered patter.
Figure 5:
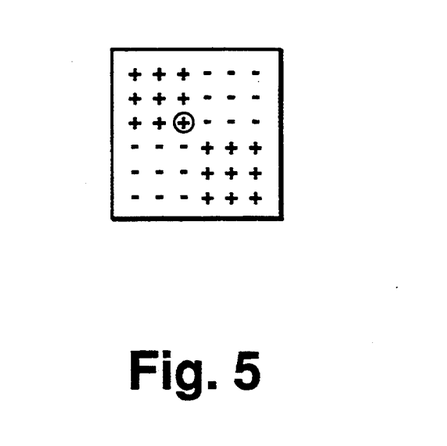
FIG. 5 is a view illustrating the arrangement of a template.

The illustrated embodiment of the present invention utilizes such a checkered calibration pattern as is shown in FIG. 4, as a specific calibration pattern. Intersecting points in the checkered pattern are used as characterizing points. First of all, a template is applied to the image data to prepare a map (S11). The template used may be one as shown in FIG. 5 and is adapted to process data of 36 marginal pixels including a circled point to be processed to determine their values. In the illustrated template, values relating to nine pixels in the upper left quadrant and nine pixels in the lower right quadrant are subject to addition while values relating to nine pixels in the upper right quadrant and nine pixels in the lower left quadrant are subjected to subtraction. By performing such a process, the data value processed by the template become maximum or minimum value at a characterizing point (intersecting point) in the checkered calibration pattern. In such a manner, the template can be used to determine a value for each point through the entire data for one frame. In this case, the value for each point takes its absolute value. Thus, each point will take its maximum value.

The neighboring maximum values are then taken from the resulting map (S12). The positions of these points are calculated by line fitting (S13). The calculated positions of the characterizing points are outputted (S14). Steps S12 and S13 are repeated to obtain the final maximum point (S15).

The line fitting used in the step S13 will now be described. When a characterizing point is calculated by the use of the template, its position becomes a point having the maximum value. In this case, the actual characterizing point must be located at the center of a square defined by the maximum point and the surrounding points, that is, right, lower right and lower points. In the actual measurement, however, the calibration pattern is not necessarily disposed perpendicular to the camera (image input device 10) and the center of the square is not necessarily at a proper position of a characterizing point.

Figure 6:
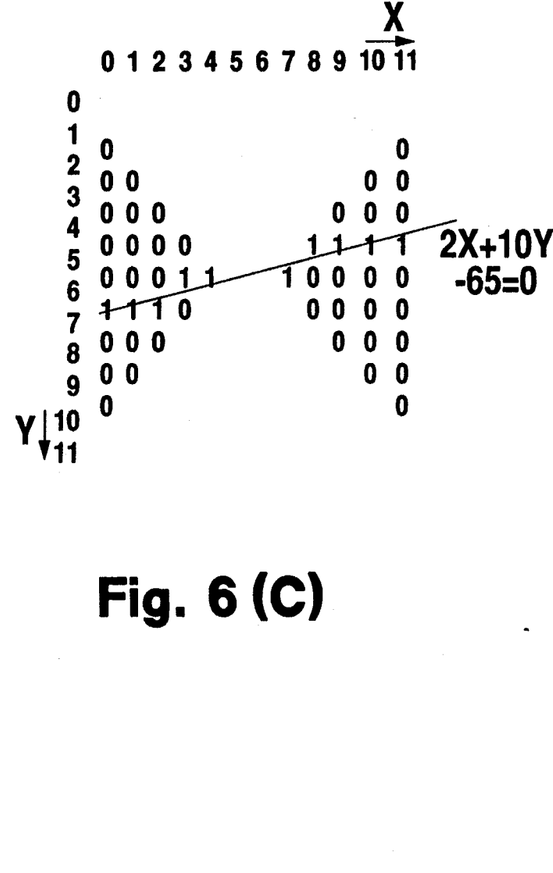
FIG. 6(a) showing binary-coded data.
FIG. 6(b) showing a manner of determining a vertical boundary line.
FIG. 6(c) showing a manner of determining a horizontal boundary line.

As shown in FIGS. 6(A)–6(C), the co-ordinate of the determined characterizing point is determined from variations of the image data about that characterizing point. For example, the image data is binary-coded into 0 or 1 according to a given threshold. Line formulas for the boundary are determined depending on changes of the binary-coded data. As shown in FIG. 6(A), the vertical line formula can be determined by calculating an absolute value of a horizontal differentiated value and sequentially determining points having larger values to form a straight line passing through these points. The horizontal line formula can be determined by differentiating values for the respective pixels in the vertical direction and determining a straight line passing through points having larger absolute differentiated values, as shown in FIG. 6(C). The co-ordinate of a characterizing point can be determined by determining an intersecting point between the two vertical and horizontal lines. Referring to FIG. 6, for example, the co-ordinate of a characterizing point obtained from the template is (5.5, 5.5). The horizontal line obtained as described is $2X+10Y-65=0$ while the vertical line is $10X+2Y-69=0$. Thus, the intersecting point between these two lines becomes ($35/6=5.833$, $32/6=5.333$). In such a manner, the position of the characterizing point can be determined more exactly.

Consequently, the precise detection of a characterizing point can be attained considering various factors, such as inclination of the calibration pattern and so on which could not be determined from the co-ordinate of the characterizing point obtained only by the template.

Position of Characterizing Point on Pattern

Figure 7:
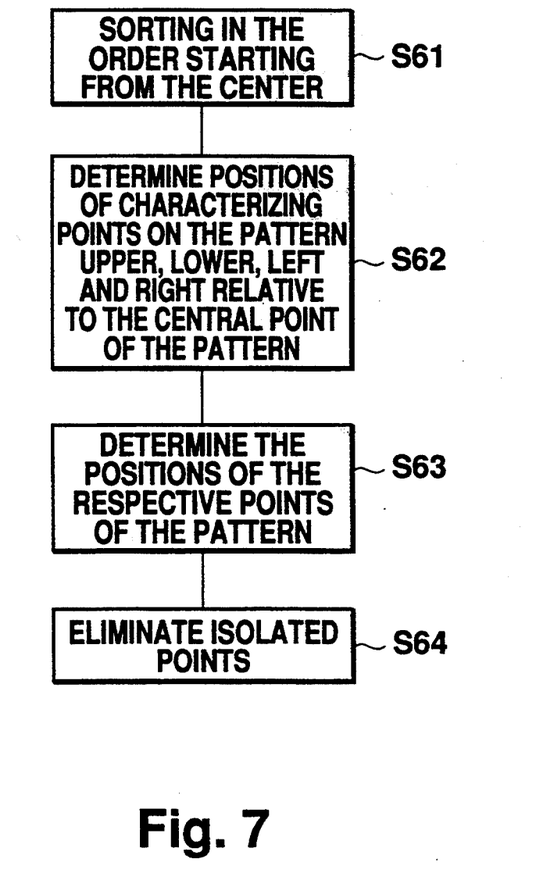
FIG. 7 is a flowchart illustrating a manner of determining relative values between the characterizing points.

In order to determine a calculated reference position relating to the characterizing point obtained as described, rather than the detected position on the image pick-up device (picture plane), the position on the pattern (position on the arrangement corresponding to the calibration pattern) is determined. More particularly, the position of the characterizing point on the pattern is determined in such a procedure as is shown in FIG. 7. In this connection, the co-ordinate of the characterizing point on the picture plane is represented by (X, Y) while the co-ordinate of the same characterizing point on the pattern is shown by (m, n).

First of all, characterizing points obtained are sorted into sequence starting from a position near the center of the picture plane (S61). For each of the sorted characterizing points, it is determined whether it is located above, below, to the right or to the left of the central point, in accordance with the following logic (S62).

Figure 8:
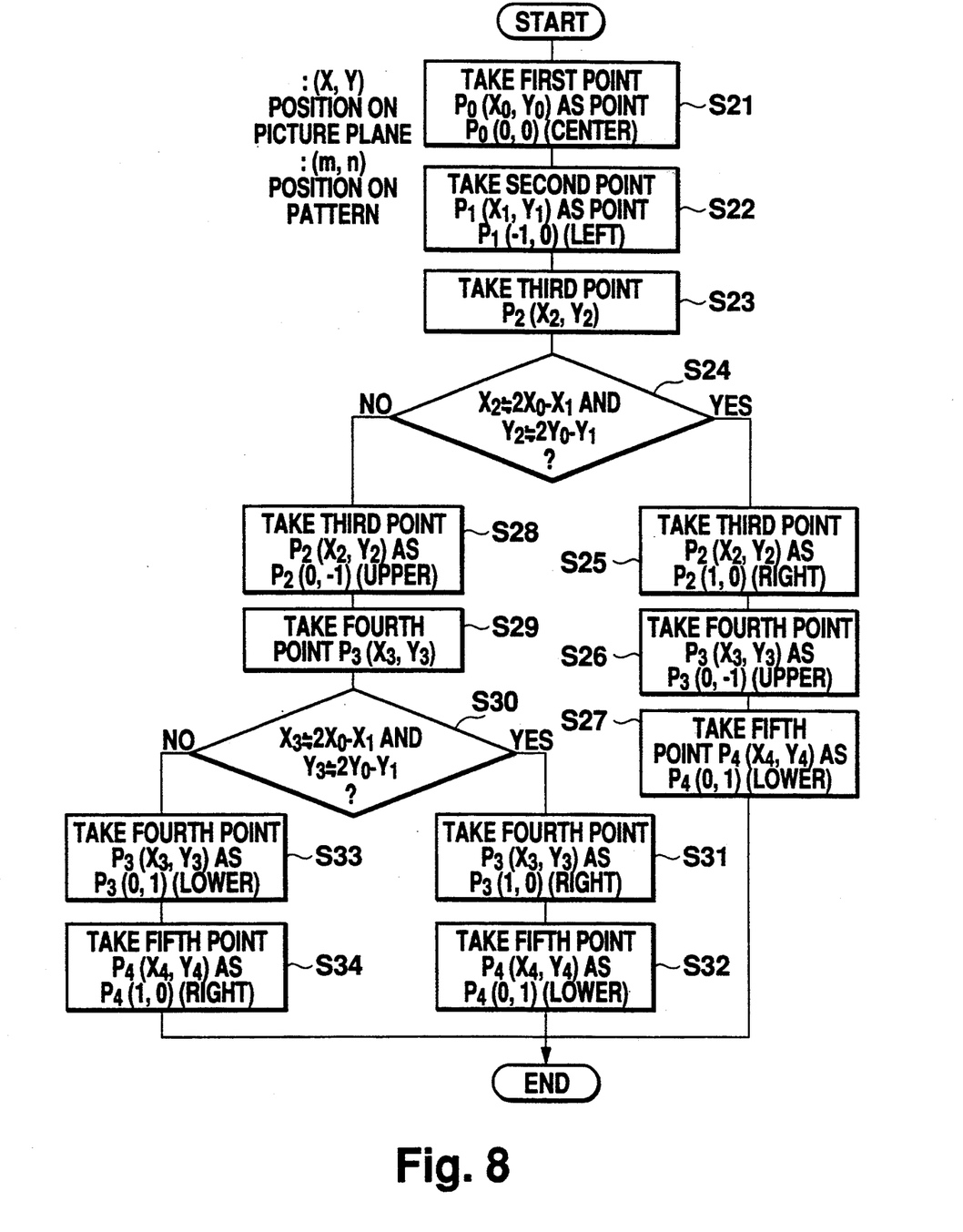
FIG. 8 is a flowchart illustrating a procedure of determining all the positions of the characterizing points.

As shown in FIG. 8, a first point P0 (X0, Y0) nearest the center of the picture plane is first taken out. The first point is assumed to be (m, n)=(0, 0)=center (S21). The next or second point P1 (X1, Y1) nearer the center is then taken out and assumed to be (m, n)=(−1, 0)=left (S22). The subsequent or third point P2 (X2, Y2) nearer the center is taken out (S23) and it is judged whether or not it is located right relative to the center (S24). Such a judgment is performed by calculating the co-ordinates of the central and left points as follows.

$$X2 - = 2X0 - X1$$

and also $$Y2 - = 2Y0 - Y1.$$

If the third point P2 (X2, Y2) is located to the right, it is assumed to be (1, 0)=right (S25). The subsequent or fourth point P3 (X3, Y3) is supposed to be (0, −1)=upper (S26) and the fifth point P4 (X4, Y4) is assumed to be (m, n)=(0, 1)=lower (S27).

On the other hand, at step S24, if the third point P2 (X2, Y2) is not right, it is assumed to be (m, n)=(0, −1)=upper (S28). Subsequently, the fourth point P3 (X3, Y3) is taken out (S29) and it is judged whether or not it is right (S30). This Judgment is attained by determining whether or not the fourth point P3 is placed in the aforementioned relationship relating to the third or left point P2 and the first or central point P0. If it is judged at the step S30 that the fourth point P3 is right, the fourth point P3 (X3, Y3) is assumed to be (m, n)=(1, 0)=right (S31) while the fifth point P4 (X4, Y4) is assumed to be (m, n)=(0, 1)=lower (S32).

If it is judged at the step S30 that the fourth point P3 (X3, Y3) is not right, this point is determined to be (m, n)=(0, 1)=lower (S33) while the fifth point P4 is assumed to be (m, n)=(1, 0)=right (S34).

In such a manner, the first point nearest the center is assumed to be left (S22). If it is judged that the second point is not at a position opposed to the first point or right, the second point is assumed to be upper (S28). It is then judged whether or not the third point is right. If not, the third point is assumed to be lower (S33) and the fourth point is assumed to be right (S34). On the other hand, if the third point is right, this point is considered to be right (S31) and the fourth point is assumed to be lower (S32). If the second point is right, the second point is considered to be right (S25) and the third and fourth points are assumed to be upper (S26) and lower (S27), respectively. In such a manner, the positions of the characterizing points located upper, lower, left and right about the central point on the pattern can be determined.

Therefore, the positions of the respective characterizing points on the pattern will be determined in accordance with the following logic (S63). In this connection, it is noted that subscripts c, r, l, u and d represent center, right, left, upper and lower, respectively.

Figure 9:
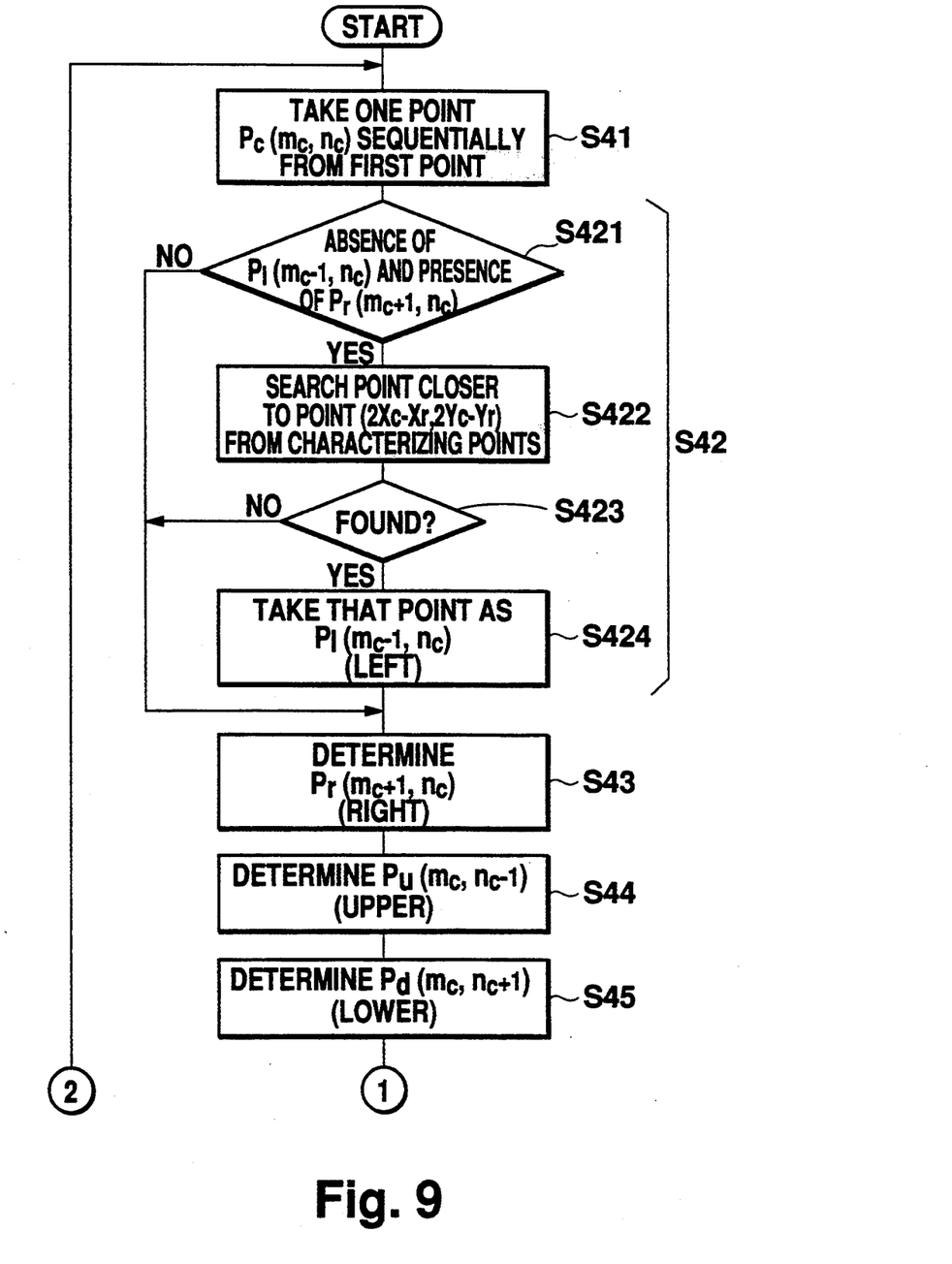
FIG. 9 is a flowchart illustrating a procedure of determining the relative positions between the characterizing points.
Figure 10:
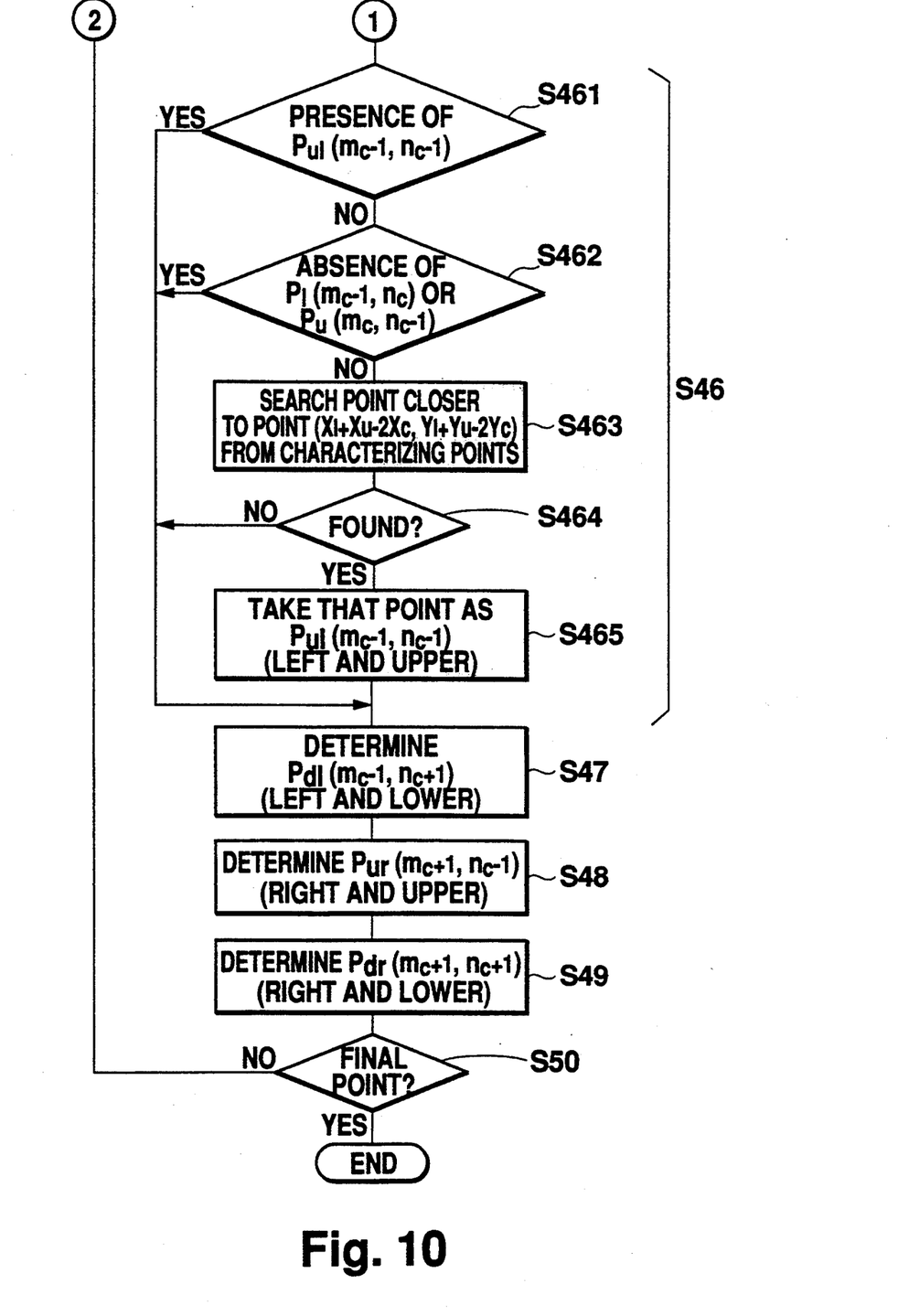
FIG. 10 is a flowchart illustrating a procedure of determining the relative positions between the characterizing points.

Such a determination will be carried out in such a procedure as shown in FIGS. 9 and 10. Although this is to be attained with respect to all the characterizing points, a point $P_c$ (m, n)=($m_c$, $n_c$) nearest the center is first taken out (S41). In the first loop, this point $P_c$ becomes the center (m, n)=(0, 0). The point $P_c$ is used as a reference point to determine a point located left about the point $P_c$ at step S42 as follows. It is judged that there is not a point $P_1$ (m, n)=($m_c-1$, $n_c$) left relative to the point $P_c$ and whether or not there is a point $P_r$ (m, n)=($m_c+1$, $n_c$) right relative to the point $P_c$ (S421). If such conditions are satisfied, a point having its co-ordinate closer to ($2X_c-X_r$, $2Y_c-Y_r$) on the picture plane is searched from the extracted characterizing points (S422). More particularly, a point located left relative to the point $P_c$ will be searched from the co-ordinates of the first taken point $P_c$ and previously present point $P_r$ on the picture plane. If a left point is found (S423), that point is assumed to be $P_1$ (m, n)=($m_c-1$, $n_c$)=left (S424). If the aforementioned conditions are not satisfied at the step S421 or if the corresponding point is not found at the step S423, the program proceeds to the next step S43.

As in the step S42, the step S43 determines points $P_r$ (m, n)=($m_c+1$, $n_c$)=right, $P_u$ (m, n)=($m_c$, $n_c-1$)=upper, $P_d$ (m, n)=($m_c$, $n_c+1$)=lower (S43, S44 and S45). Next, an upper left point $P_{ul}$ (m, n)=($m_c-1$, $n_c-1$) is determined (S46). To this end, it is first judged whether or not there is the point $P_{ul}$ (m, n)=($m_c-1$, $n_c-1$) (S461). If there is not the point $P_{ul}$, it is then judged whether or not there is a left point $P_1$ (m, n)=($m_c-1$, $n_c$) or the upper point $P_u$ (m, n)=($m_c$, $n_c-1$) (S462). If these two point $P_1$ and $P_u$ exist and if NO at the step 462, a point having its co-ordinate closer to ($X_1+X_u-2X_c$, $Y_1+Y_u-2Y_c$) on the picture plane is searched from the characterizing points (S463). In other words, an upper left point is searched from three known points.

If a point having such a co-ordinate is found (S462), this point is determined to be $P_{ul}$(m, n)=($m_c-1$, $n_c-1$) (S465). If there has already existed the upper left point $P_{ul}$ at the step 461 or if there is not the point in question at the step 464, the program proceeds to the next step 47.

The same procedure is used to determine points $P_{dl}$ (m, n)=($m_c-1$, $n_c+1$)=lower left, $P_{ur}$ (m, n)=($m_c+1$, $n_c-1$)=right and upper and $P_{dr}$ (m, n)=($m_c+1$, $n_c+1$)=lower right (S47, S48 and S49). Such a process is repeated until the final point to be processed has been determined (S50).

In such a manner, relative positions will be determined in the relationship relative to the points sequentially determined starting from the center.

After the positions of the respective points on the pattern have been determined in accordance with the aforementioned logic, a two-dimensional co-ordinate (m, n) is applied to each of these points.

In the aforementioned procedure, points at positions other than the intersecting points in the checkered pattern should not be taken as characterizing points. Once the positions of the characterizing points extracted by the aforementioned procedure have been determined, the positions of points not specifically interrelating to the determined characterizing points will be determined. Such points must not exist in the data of the specific pattern although they have been extracted as characterizing points. These points are referred to as isolated points which will be eliminated (S64).

After the characterizing points have been determined with respect to their positions (X, Y) and (m, n) on the picture plane and pattern, respectively, they will be stored in the characterizing point storing memory 26.

Determination of Correcting Function

Figure 11:
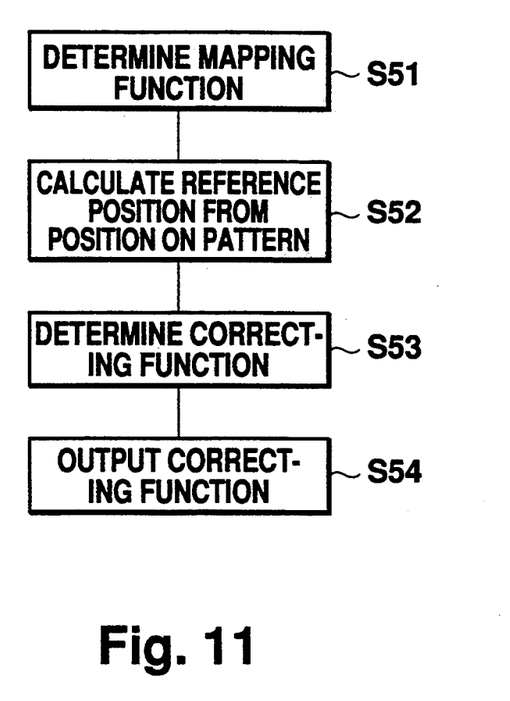
FIG. 11 is a flowchart illustrating the correcting function determining operation.

After all the characterizing points obtained from the image data have been determined with respect to their positions (m, n) on the pattern, the correcting function is determined from these positions as well as the configuration of the particular pattern. More particularly, the correcting function is determined by such a procedure as is shown in FIG. 11. First of all, a mapping function is determined from the relative and concrete positions (m, n), (X, Y) of the characterizing points on the pattern and picture plane, respectively (S51). The mapping function is determined only using only a quarter of all the characterizing points about the center. This is because it is believed that less non-linear strain exists at positions closer to the center and a mapping function approximating to that of the original image can be obtained.

Subsequently, the determined mapping function is used to calculate reference positions for all the characterizing points determined with respect to their positions on the pattern (S52). Thereafter, the reference positions are compared with the actual positions (X, Y) of the characterizing points on the picture plane to determine a deviation. A correcting function for correcting such a deviation is then determined (S53). The determined correcting function is stored in the correcting function storing memory 34 (S54).

Calculation of Mapping Function

Figure 12:
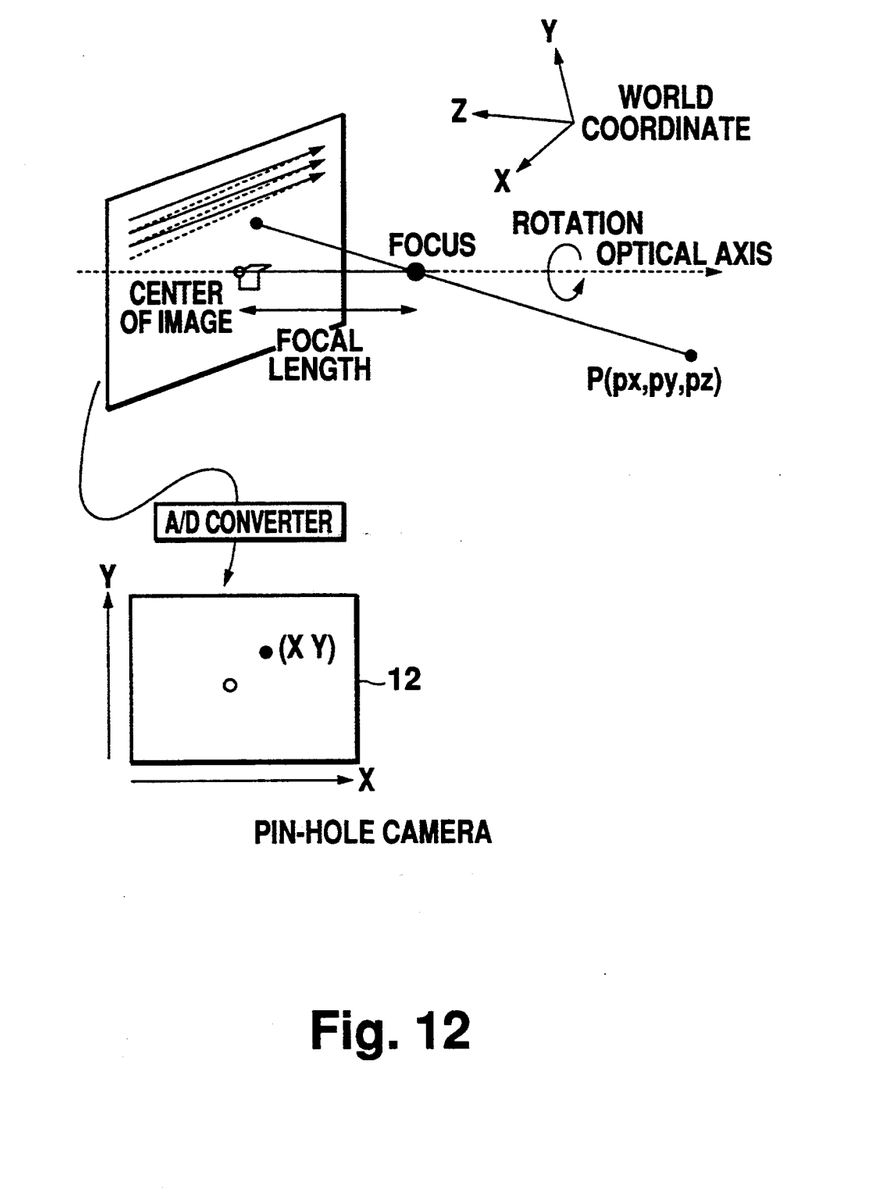
FIG. 12 illustrating the principle of a pin-hole camera.

An actual image pick-up by a camera ideally approximates to that of a pin-hole camera. As shown in FIG. 12, a light beam from a point P in a three-dimensional space is projected onto an image plane (flat plane) through a focusing means. An image formed on the image plane is stored in the input image data storing memory 12 through photoelectric and A/D conversions. The position (X, Y) of that image on the memory 12 becomes a position on the picture plane. If the camera is a pin-hole camera, it is known that there is the following linear function (mapping function) between the position (m, n) on the pattern and the position (X, Y) on the picture plane:

$$X = (cm + dn + e)/(am + bn + 1)$$

and $$Y = (fm + gn + h)/(am + bn + 1).$$

For the characterizing points extracted by the aforementioned procedure, thus, their positions (m, n) and (X, Y) on the pattern and picture are substituted into the above equations to determine constants a–h from the least squares method. In such a manner, the mapping function in the pin-hole camera can be determined. The least squares method is described as in "IWANAMI Lectures: Information Science 18, Numerical Calculation", IWANAMI SHOTEN, First Edition, Jan. 8, 1982.

The characterizing points used to determine the mapping function are only those nearer the center ($\frac{1}{4}$ times all the characterizing points). This is because it is believed that the points nearer the center properly approximate to those of the pin-hole camera. Thus, coefficients highly interrelated to one another can be obtained from these characterizing points to obtain a mapping function having an increased accuracy.

Movement of Relative Position to Reference Position

Since the mapping function is determined as described, the positions of all the extracted characterizing points can be calculated by the use of such a mapping function. More particularly, if the image input device 10 is a pin-hole camera, the calculated positions on which the characterizing points determined with respect to their positions (m, n) on the pattern should be placed are determined by the aforementioned mapping function. Thus, the reference positions (x, y) of all the characterizing points determined with respect to their extracted positions (m, n) on the pattern can be calculated by the use of the mapping function.

Calculation of Correcting Function

Subsequently, the reference positions (x, y) thus determined are compared with the actual positions (X, Y) on the picture plane to detect a deviation therebetween. A correcting function for overcoming this deviation is then determined. The correcting function is determined by using the following polynomial and by determining coefficients with the least squares method.

$$x = a1X^4 + b1X^3Y + c1X^2Y^2 + d1XY^3 + e1Y^4 + f1X^3 + g1X^2Y + h1XY^2 + i1Y^3 + j1X^2 + k1XY + 1Y^2 + m1X + n1Y + o1;$$

and $$y = a2X^4 + b2X^3Y + c2X^2Y^2 + d2XY^3 + e2Y^4 + f2X^3 + g2X^2Y + h2XY^2 + i2Y^3 + j2X^2 + k2XY + 12Y^2 + m2X + n2Y + o2.$$

In such a manner, the present invention can determine the mapping function used in the pin-hole camera from the characterizing points nearer the center of the picture plane. The determined mapping function is used to calculate the reference positions (x, y) of all the characterizing points on the picture plane. The calculated reference positions (x, y) are then compared with the actual positions (X, Y) on the picture plane to calculate the correcting function. Therefore, the correcting function can be determined very accurately, in comparison with the case where the strain in the image is directly corrected.

Since the correcting function has previously been stored in the correcting function storing memory 34 and the correcting function is used to correct the image data from the input image data storing memory 12 with the corrected image being displayed in the image output device 20, the characterizing points will be outputted onto positions determined when the image input device 10 functions as a pin-hole camera. Therefore, an image having no strain can be outputted to the image output device 20 after the image has been picked up by the pin-hole camera.

The use of the image input device 10 as a pin-hole camera enables the position of the actually picked-up object to be accurately grasped from the position of the image when the image data is processed by the image processing section 22. Thus, any three-dimensional image can be precisely measured with respect to its position.

We claim:

1. A method of correcting the strain of an image in pick-up data obtained by an image pick-up device, said method comprising the steps of:
   (A) providing a substantially planar, optically observable calibration pattern having optically detectable characterizing points;
   (B) forming an image of the calibration pattern, in the image pick-up device, and deriving, from the image, data representative of a plurality of image points including image points corresponding to characterizing points;
   (C) extracting the characterizing points from the resulting data;
   (D) calculating a mapping function representing the relationship between the positions of the characterizing points in the pick-up data obtained by said step of extracting the characterizing points and the positions of the characterizing points that have been known in said calibration pattern;
   (E) calculating reference positions at which the characterizing points should be present in the pick-up data from the positions of the characterizing points in the calibration pattern by the use of said mapping function; and
   (F) calculating a correcting function for correcting the positions of the characterizing points, based on said reference positions and the positions of the characterizing points in the pick-up data.

2. A method as defined in claim 1 wherein the calibration pattern has a center point and said mapping function calculating step includes the step of calculating the mapping function from a predetermined number of characterizing points near the center point of the pattern, based on data obtained at the characterizing point extracting step.

3. A method as defined in claim 1 wherein said reference position calculating step includes the step of using the determined mapping function to calculate reference positions for substantially all the characterizing points in the pick-up data.

4. A method as defined in claim 1 wherein said calibration pattern is a checkered pattern.

5. A method as defined in claim 4 wherein said characterizing points are intersecting points in the checkered pattern.

6. A method as defined in claim 5 wherein said characterizing point calculating step includes the steps of using a template defining computing means for the pick-up data of the surrounding area including positions to be processed to calculate an estimating value for each position to be processed and calculating the corresponding characterizing points based on variations of said estimating value.

7. A method as defined in claim 6 wherein said characterizing point calculating step includes the steps of calculating boundary lines of the pattern based on variations of the pick-up data about the temporary characterizing points calculated from said estimating values and calculating each characterizing point from an intersecting point between said boundary lines.

8. A method of correcting the strain of an image in pick-up data obtained by an image pick-up device, said method comprising the steps of:
   providing a substantially planar, optically observable calibration pattern having an optically detectable checkerboard pattern;
   forming an image of the calibration pattern, in the image pick-up device, and deriving data from the image representative of a plurality of image points including characterizing points;
   extracting characterizing points which are known intersecting points in the checkerboard pattern from the data relating to said pattern; and
   using the positions of the characterizing points obtained at said characterizing point extracting step with the data relating to said calibration pattern to calculate a correcting function for correcting the positions of said characterizing points,
   said characterizing point calculating step comprising the steps of:
       using a template defining computing means for the pick-up data of the surrounding area including positions to be processed to calculate an estimating value for each position to be processed;
       calculating boundary lines of the pattern based on variations of the pick-up data about the temporary characterizing points calculated from said estimating values; and
       calculating each characterizing point from an intersecting point between said boundary lines.

9. A method as defined in claim 8, further comprising the step of calculating two boundary lines by differentiating said estimating values in the vertical and horizontal directions.

10. An apparatus of correcting the strain of an image in pick-up data obtained by an image pick-up device, said apparatus comprising:
    (A) a substantially planar, optically observable calibration pattern having optically detectable characterizing points;
    (B) an image pick-up device for forming an image of the calibration pattern and deriving, from the image, data representative of a plurality of image points including image points corresponding to characterizing points;
    (C) means for extracting characterizing points from the data of the calibration pattern in which a plurality of characterizing points are known;
    (D) a memory for storing the detected positions of the characterizing points;
    (E) means for calculating a mapping function representing the relationship between the positions of the characterizing points in the pick-up data stored in said characterizing point storing memory and the positions of the known characterizing points in said calibration pattern;

(F) deviation detecting means for using said mapping function obtained by said mapping function calculating means to calculate reference positions at which said characterizing points should be present in the pick-up data from the positions of the characterizing points in said calibration pattern and for comparing the calculated reference positions with the positions of the characterizing points in the pick-up data to detect a deviation therebetween, and means for calculating a correcting function for correcting the positions of the characterizing points from the detected deviation and mapping function;

(G) a memory for storing the calculated correcting function and;

(H) image data correcting means for using the correcting function read out from said correcting function storing memory to correct the pick-up data.

11. An apparatus as defined in claim 10, further comprising switching means for selectively supplying the pick-up data obtained by the image pick-up device to either of said characterizing point detecting means or image data correcting means.

* * * * *